US007948839B2

(12) United States Patent
Kayama et al.

(10) Patent No.: US 7,948,839 B2
(45) Date of Patent: May 24, 2011

(54) OPTICAL DISK APPARATUS

(75) Inventors: Hiroshi Kayama, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 883 days.

(21) Appl. No.: 11/812,547

(22) Filed: Jun. 20, 2007

(65) Prior Publication Data

US 2007/0297299 A1 Dec. 27, 2007

(30) Foreign Application Priority Data

Jun. 22, 2006 (JP) ................................ 2006-172140

(51) Int. Cl.
*G11B 7/00* (2006.01)
(52) U.S. Cl. ................ 369/44.29; 369/44.26; 369/44.35
(58) Field of Classification Search ............... 369/44.29, 369/44.26, 44.35
See application file for complete search history.

(56) References Cited

U.S. PATENT DOCUMENTS

| 5,999,502 A * | 12/1999 | Nakata et al. ............... 369/44.26 |
| 6,240,055 B1 * | 5/2001 | Takamine et al. .......... 369/44.29 |
| 6,621,774 B2 * | 9/2003 | Iwanaga ..................... 369/44.34 |
| 6,643,234 B2 * | 11/2003 | Iwanaga ..................... 369/47.17 |
| 6,996,044 B2 * | 2/2006 | Takeda ........................ 369/53.22 |
| 2003/0147330 A1 * | 8/2003 | Teraoka et al. .......... 369/112.02 |

FOREIGN PATENT DOCUMENTS

| JP | 07-129975 | 5/1995 |
| JP | 08-329484 | 12/1996 |
| JP | 10-091976 | 4/1998 |

* cited by examiner

*Primary Examiner* — Craig A. Renner
*Assistant Examiner* — Aneeta Yodichkas
(74) *Attorney, Agent, or Firm* — Bacon & Thomas, PLLC

(57) ABSTRACT

An optical disk apparatus includes: an optical pickup unit for reading out information recorded on an optical disk; a demodulation circuit for demodulating digital data from an output signal of the optical pickup unit; and a controller for performing a servo control based on the output signal of the optical pickup unit. When performing a focus/tracking control in a recess and a protrusion of a guide groove of the optical disk, the controller obtains a focus control gain difference between the recess and the protrusion by comparing focus offsets with respect to variations in amplitudes of signals from the optical disk for the recess and the protrusion, respectively.

6 Claims, 8 Drawing Sheets

301

302

OPTICAL DISK APPARATUS

FIELD OF THE INVENTION

The present invention relates to an optical disk apparatus having a novel focus control method for use in recording or reproducing data to or from optical disks.

BACKGROUND OF THE INVENTION

FIG. 10 provides a block diagram illustrating an exemplary configuration of a general optical disk recording/reproducing apparatus. As shown in FIG. 10, light emitted from a laser, which serves as a light source installed on laser diode unit (hereinafter, referred to as "LDU") 102, is converted into collimated light by collimating lens 103 and then passes through polarization hologram 104. The linearly polarized light from polarization hologram 104 is then converted into circularly polarized light by quarter-wave plate 105 and focused on optical disk 101 by objective lens 106 driven by actuator 107, optical disk 101 being rotated by spindle motor 108. Objective lens 106 can be moved by actuator 107 in focusing direction F and tracking direction (track crossing direction) T. The light reflected by optical disk 101 passes through objective lens 106 and then is converted by quarter-wave plate 105 from the circularly polarized light to linearly polarized light, the polarization direction thereof being perpendicular to that of the linearly polarized light impinged upon quarter-wave plate 105 from polarization hologram 104. Thereafter, the light is diffracted by polarization hologram 104 and then passes through collimating lens 103. Next, the light is received by a photodetector serving as a light-receiving element on LDU 102. The photodetector outputs to pre-amplifier 121 a detection signal of the incident light thereon. Pre-amplifier 121 generates, from the detection signal, a focus error signal (hereinafter, referred to as "FE signal"), a tracking error signal (hereinafter, referred to as "TE signal") and an RF signal, as will be described in detail later.

The FE signal indicates that a beam spot formed on a data recording layer of optical disk 101 is not in a specific focus state due to the deviation of objective lens 106 from a proper focus position in focusing direction F. The TE signal indicates that the beam spot is shifted in tracking direction T due to the deviation of objective lens 106 from a proper tracking position in the tracking direction T. The RF signal has data information recorded as pits or marks in the data recording layer of optical disk 101 and address information of tracks to or from which data is recorded or reproduced. Signal processing unit 122 receives the RF signal, and then extracts and reproduces the recorded data information and the address information. Servo unit 123 receives the FE signal and the TE signal and then generates a control signal for the control of actuator 107 to control objective lens 106 based on the control signal. Servo unit 123 also controls spindle motor 108. Laser driving unit 125 controls an output power of the laser on LDU 102 to be used in recording or reproducing data. The information reproduced by signal processing unit 122 is transmitted to controller 124. Servo unit 123 and laser driving unit 125 are operated under the control of controller 124.

FIG. 8 depicts an FE signal detection unit using a general spot size detection (hereinafter, referred to as "SSD") method. Photodetector 201 is provided on LDU 102 and detects the FE signal. The FE signal is generated based on the output from photodetector 201. Referring to FIG. 8, the FE signal of "(b+c)−(a+d)" is generated by subtractor 204, and a summation signal, i.e., an FS signal of "a+b+c+d", is generated by adder 205. From the FS signal, the RF signal is obtained. Reference numeral 202 represents a spot where detected light from the optical disk is focused in front of a detection surface of photodetector 201; and reference numeral 203 represents a spot where detected light from the optical disk is focused behind a detection surface of photodetector 201. When the distance between the optical disk and the objective lens changes, the size of one of spots 202 and spot 203 increases and the size of the other spot decreases. In this manner, the FE signal is generated.

When a disk having a groove, such as a DVD±R, a DVD-RAM or the like, is reproduced, zeroth-order light and first-order light are generated due to a diffraction by the groove. A guide groove of the above-described optical disk has protrusions (lands) and recesses (grooves). FIGS. 3A and 3B provide schematic diagrams showing distributions of detected light from an optical disk on a photodetector. Reference numerals 301 and 302 indicate light distributions in case of reproduction from a land and a groove reproduction, respectively. As shown in FIGS. 3A and 3B, the light distributions are inverted in case of the land and the groove reproduction. Instead of the full circle represented by reference numerals 301 or 302, a quarter sector shaped portions 902 and 903 focused on photodetector 901 as shown in FIG. 9 can be used as light spots for focus control, for example. Further, depending on the positional relationship between the photodetector and the spot, a variation in an amplitude of the FE signal due to defocusing may be changed for the land and the groove.

FIGS. 4A and 4B depict FE signals in case of changing the distance between the optical disk and the objective lens at the centers of a land track and a groove track, respectively. Dashed lines in FIGS. 4A and 4B represent FE signals at in-focus points.

FIG. 5 is a graph describing open-loop characteristics of a focus servo at a specific servo band frequency in case of changing a defocusing amount while setting an identical circuit gain for the land and the groove. When the FE signal has an inflection point near the in-focus point as shown in FIGS. 4A and 4B, focus gains in the land and the groove vary as shown in FIG. 5. Therefore, when variations in jitters and RF amplitudes with respect to a variation in the FE signal are measured, sensitivities in the land and the groove are different from each other, as shown in FIGS. 6A and 6B. In FIGS. 6A and 6B, curves opening upwards and downwards indicate jitter characteristics and RF amplitude characteristics, respectively.

If the focus control is performed while setting an identical circuit gain for the land and the groove when there exists an optical gain difference of the focus servo between the land and the groove, the focus servo may oscillate in the land due to its high gain or a focus control error may increase in the groove due to its low gain, depending on the setting. Therefore, it is preferable to set different circuit gains for the land and the groove.

Japanese Patent Laid-open Applications Nos. H7-129975 and H8-329484 disclose therein a gain-switching unit of a focusing error signal and a tracking error signal switching between the land and the groove.

Moreover, Japanese Patent Laid-open Application No. H10-91976 proposes a technique for setting gains in a land and a groove based on sensitivities calculated by using a focusing error signal and a tracking error signal obtained while driving an objective lens.

However, in order to measure open-loop gains of a servo system, it is required to use an expensive measuring equipment, e.g., a frequency characteristic analyzer or the like, or a circuit having a function same as that of the frequency characteristic analyzer, thereby increasing an installation space, a size of a circuit and costs.

SUMMARY OF THE INVENTION

It is, therefore, an object of the present invention to provide an optical disk apparatus capable of quickly setting gains of a focus servo by measuring a gain difference between a land and a groove with a simple operation without increasing an installation space, a size of a circuit and costs.

In accordance with an embodiment of the present invention, there is provided an optical disk apparatus including:

an optical pickup unit for reading out information recorded on an optical disk;

a demodulation circuit for demodulating digital data from an output signal of the optical pickup unit; and a controller for performing a servo control based on the output signal of the optical pickup unit, wherein, when performing a focus/tracking control in a recess and a protrusion of a guide groove of the optical disk, the controller obtains a focus control gain difference between the recess and the protrusion by comparing focus offsets with respect to variations in amplitudes of signals from the optical disk for the recess and the protrusion, respectively.

It is preferable that focus control gains in the recess and the protrusion are set by comparing the focus offsets with respect to the variations in the amplitudes of the signals from the optical disk for the recess and the protrusion, respectively.

It is preferable that the signals from the optical disk are summation signals.

It is preferable that a focus control circuit gain $G_g$ for the recess is set as:

$$G_g = G_l - 20*\log(\Delta V_g / \Delta V_l),$$

wherein $G_l$ is a focus control circuit gain for the protrusion; and $\Delta V_g$ and $\Delta V_l$ are focus offset widths in the recess and the protrusion, respectively, each width representing a range within which an amplitude of each signal from the optical disk reduces from a maximum level to a specific level.

In accordance with another embodiment of the present invention, there is provided an optical disk apparatus including:

an optical pickup unit for reading out information recorded on an optical disk;

a demodulation circuit for demodulating digital data from an output signal of the optical pickup unit; and a controller for performing a servo control based on the output signal of the optical pickup unit, wherein, when performing a focus/tracking control in a recess and a protrusion of a guide groove of the optical disk, the controller obtains a focus control gain difference between the recess and the protrusion by comparing focus offsets with respect to variations in amplitudes of signals from the optical disk for the recess and the protrusion of the guide groove and a flat portion having no guide groove, respectively.

It is preferable that focus control gains in the recess and the protrusion are set by comparing focus offsets with respect to the variations in the amplitudes of the signals from the optical disk for the recess and the protrusion of the guide groove, and the flat portion having no guide groove, respectively.

It is preferable that the signals from the optical disk are summation signals.

It is preferable that a focus control circuit gain $G_g$ for the recess and a focus control circuit gain $G_l$ for the protrusion of the guide groove is set as:

$$G_g = G_m - 20*\log(\Delta V_g / \Delta V_m); \text{ and}$$

$$G_l = G_m - 20*\log(\Delta V_l / \Delta V_m)$$

wherein $G_m$ is a focus control circuit gain for the flat portion having no guide groove; and $\Delta V_g$, $\Delta V_l$ and $\Delta V_m$ are focus offset widths in the recess, the protrusion and the flat portion, respectively, each width representing a range within which an amplitude of each signal from the optical disk reduces from a maximum level to a specific level.

In accordance with still another embodiment of the present invention, there is provided an optical disk apparatus including:

an optical pickup unit for reading out information recorded on an optical disk;

a demodulation circuit for demodulating digital data from an output signal of the optical pickup unit; and a controller for performing a servo control based on the output signal of the optical pickup unit, wherein, when setting optimal focus positions in a recess and a protrusion of a guide groove of the optical disk, the controller sets an adjustment step size of a focus offset for one of the recess and the protrusion to be smaller than that for the other, a focus control gain for the one being lower than that for the other.

In accordance with the embodiments of the present invention, as for a differential signal detected in FIGS. 3A and 3B or FIG. 9, i.e., the FE signal, even if an inflection point is generated because spots of light distributions on the photodetector exceed parting lines of the photodetector, a summation signal, i.e., the RF signal (or the FS signal) is not affected thereby. Therefore, gains of a focus control circuit can be set by obtaining a gain difference of a focus servo between a protrusion and a recess based on a variation in an amplitude of an RF signal of an optical disk with respect to a defocusing, without employing a frequency characteristic analyzer or a circuit having a function same as that of the frequency characteristic analyzer. Accordingly, an open loop gain difference between the protrusion and the recess can be simply reduced and, hence, a focus control of an optical disk can be stabilized. Further, the optimal focus position learning can be performed by setting an adjustment step size of a focus offset for one of the protrusion and the recess smaller than that for the other, an optical gain of a focus control for the one being lower than that for the other.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with reference to the accompanying drawings. Since an optical configuration of an optical pickup unit is same as that of the prior art, a description thereof will be omitted.

Embodiment 1

Figure 1:
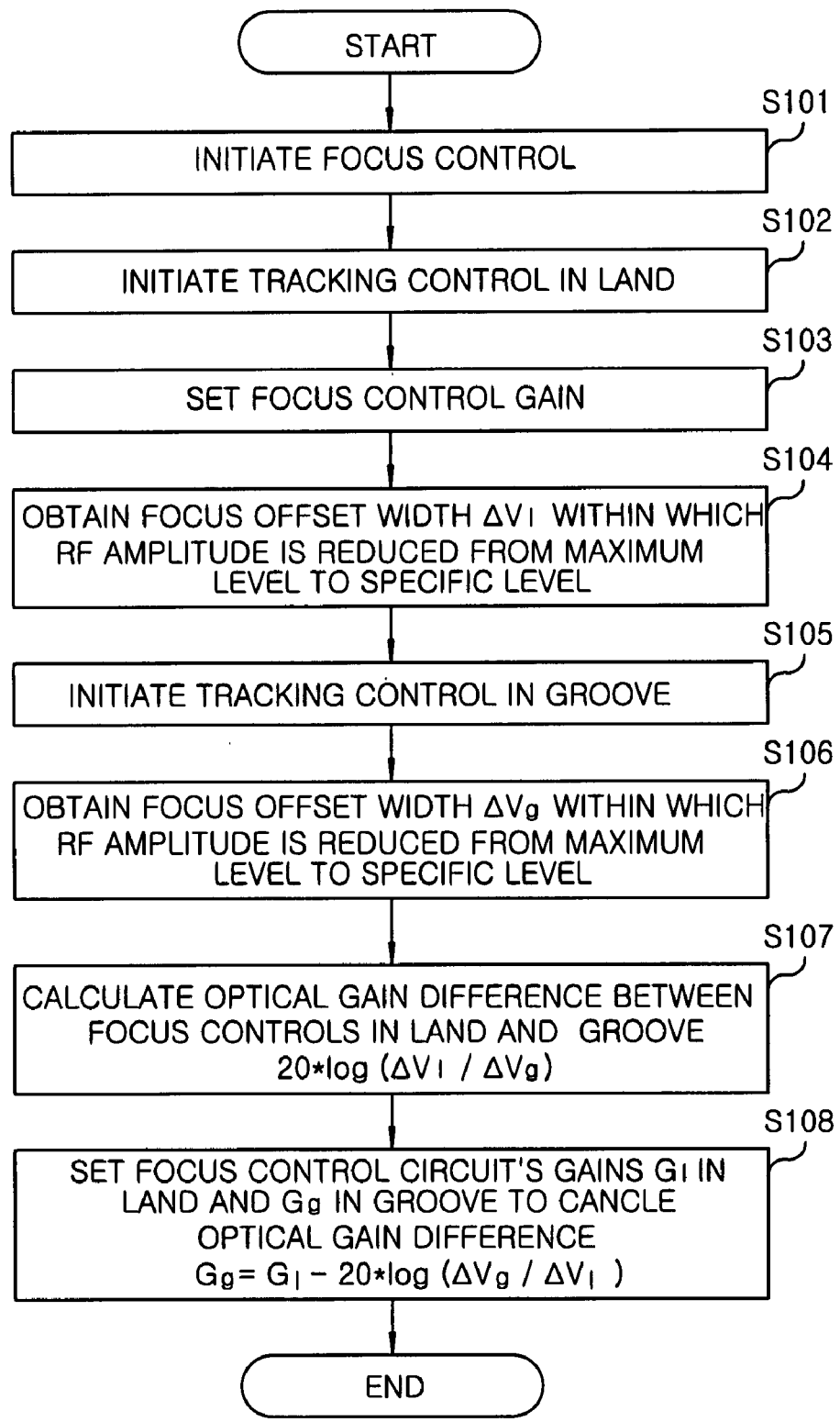
FIG. 1 is a flowchart showing an operation of an optical disk apparatus in accordance with a first embodiment of the present invention.

In this embodiment, an amplitude of an RF or an FS signal from an optical disk is used in measuring a gain difference of a focus servo between a land and a groove of the optical disk and setting gains in the land and the groove. A control sequence using the RF signal will be explained with reference to the flowchart of FIG. 1.

To begin with, a focus control for an optical disk is initiated (ON) (step S101).

Next, a tracking control in a land of the optical disk is initiated (ON) (step S102). In this example, the tracking for the land is performed first for the sake of description. However, a tracking for a groove can be performed first.

A focus control gain in the land is set to a preset value or a value at which a focus control error is smaller than or equal to an allowable amount (step S103).

Figure 7A:
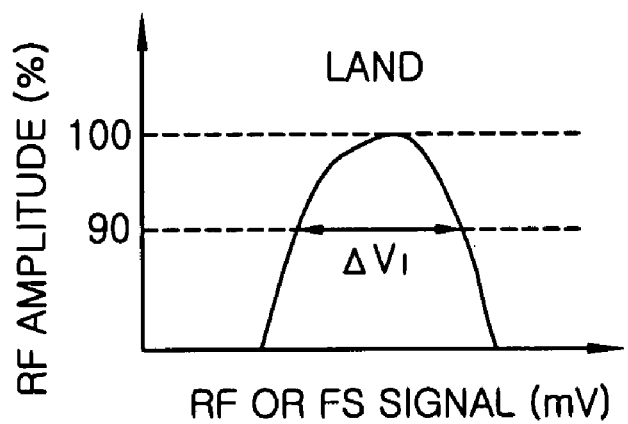
FIGS. 7A and 7B respectively show a characteristic diagram depicting a focus offset width representing a range within which an amplitude of an RF signal reduces from a maximum level to a specific level.
Figure 7B:
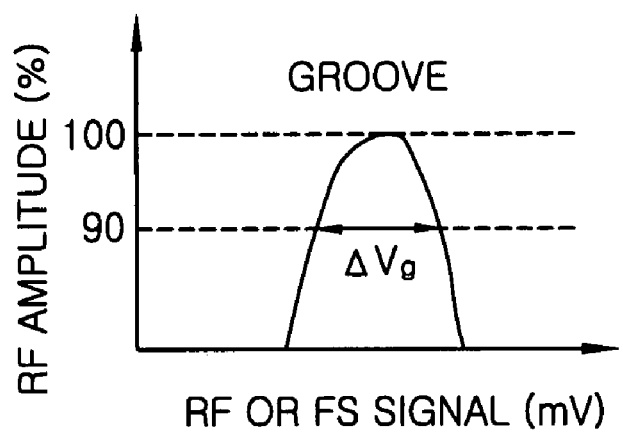
Figure 8:
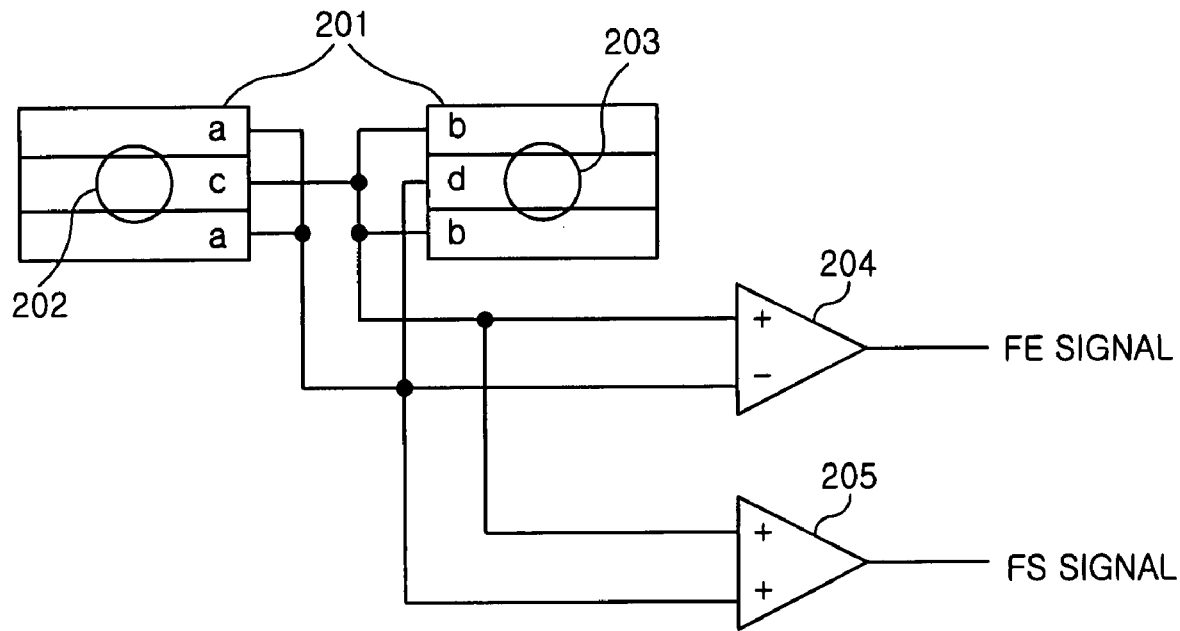
FIG. 8 provides a conceptual diagram showing a configuration of an FE signal detection unit using a conventional SSD method.
Figure 9:
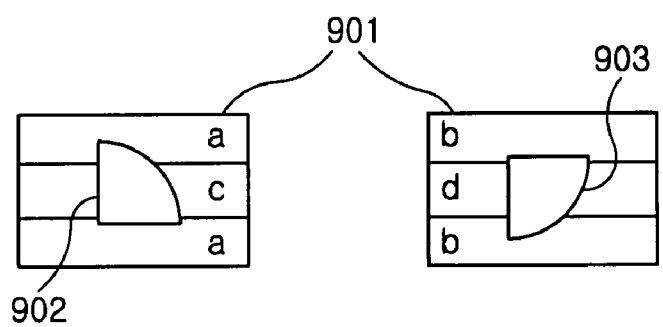
FIG. 9 is a conceptual diagram of an FE signal detection unit using an SSD method utilizing a part of an opening.

Thereafter, a focus offset width representing, as shown in FIGS. 7A and 7B, a range within which an amplitude of an RF signal reduces from a maximum level to a specific level is obtained (step S104). To be specific, the RF signal is reproduced in order to find a focus point where an RF signal reaches the maximum amplitude. Next, there are obtained a plus and a minus focus offset at which the RF signal reaches a level corresponding to 90% of the maximum amplitude for example, and the width between the two focus offsets (hereinafter, referred to as "$\Delta V_l$") is stored.

Next, a tracking control in the groove is initiated (ON) (step S105).

Then, as in step S104, a focus offset width (hereinafter, referred to as "$\Delta V_g$") representing a range within which an amplitude of the RF signal in the groove reduces to a specific level is also obtained (step S106).

Figure 5:
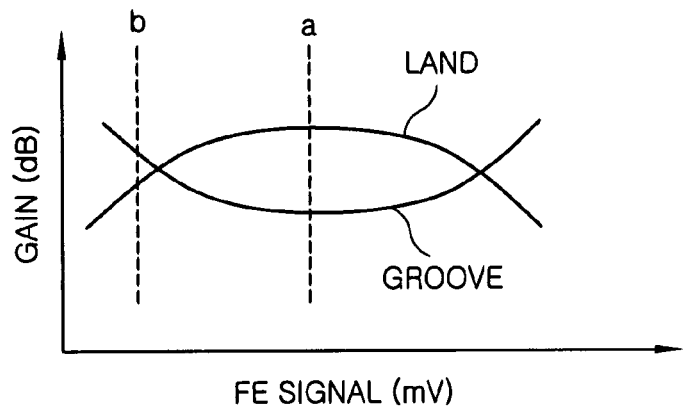
FIG. 5 represents open-loop characteristics of a focus servo at a specific frequency in case of changing a defocusing amount.

From the above, an optical focus gain difference between the land and the groove is obtained as $20*\log(\Delta V_l/\Delta V_g)$ (step S107). For example, points "a" and "b" shown in FIG. 5 have different focus offsets, so that the gain differences between the land and the groove at points "a" and "b" are different. Therefore, in order to determine an average gain difference between the land and the groove, gains need to be measured at multiple points by using a frequency characteristic analyzer or a circuit having a same function as that of the frequency characteristic analyzer. However, in accordance with the measurement method of the present embodiment, an average gain difference in a measuring range can be easily obtained simply by measuring an amplitude of the RF signal in the land and the groove.

Figure 10:
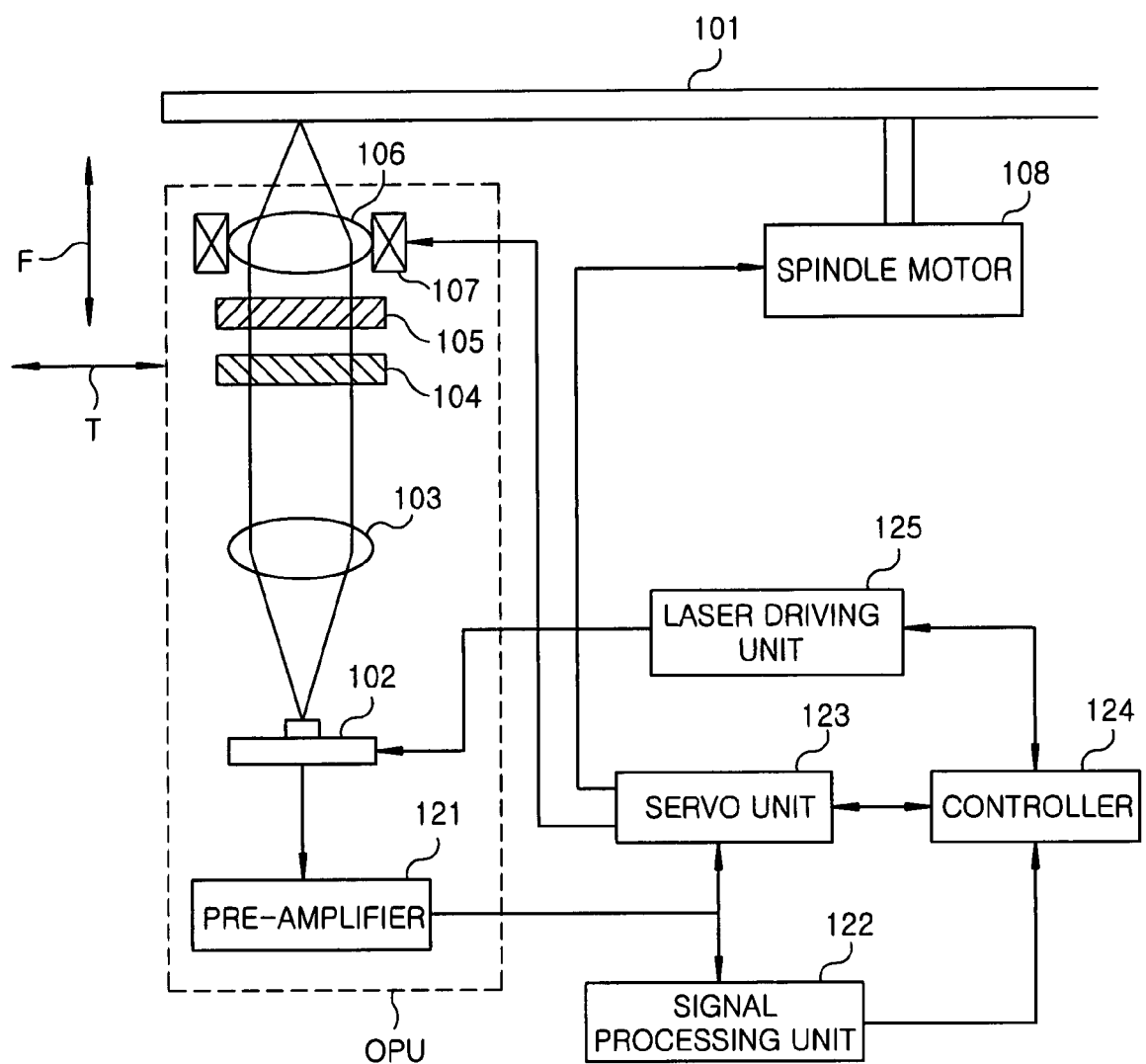
FIG. 10 sets forth a conceptual diagram depicting an exemplary configuration of a general optical disk recording/reproducing apparatus.

Next, gains in the land and the groove are set (step S108). Specifically, gain $G_l$ for the land and gain $G_g$ for the groove of the focus control circuit (which is constituted by parts of functions of controller 124 and servo unit 123 shown in FIG. 10) are set by Eq. 1 so that the optical gain difference therebetween can be canceled:

$$G_g = G_l - 20*\log(\Delta V_g/\Delta V_l) \quad \text{Eq. 1}$$

By setting the gains as described above, the gain difference generated by the focusing error signals from the land and the groove, which is, can be compensated by the focus control circuit. As a consequence, focus servo control gains, each gain including a pickup (or optical) and a circuit gain in the land and the groove, can be obtained. In accordance with the method of the present embodiment, there arises no need for an additional circuit for measuring open-loop characteristics of the focus servo. Also, the gains can be compensated with a simple operation of measuring a variation in an amplitude of an RF signal of an optical disk with respect to a defocusing in the land and the groove. Since only the relative relationship between $G_g$ and $G_l$ can be obtained from the aforementioned Eq. 1, the gain $G_g$ (or $G_l$) may need to be additionally corrected to obtain optimum gains such that the focus control error is smaller than or equal to a specific amount and the focus servo does not oscillate.

Embodiment 2

Figure 2:
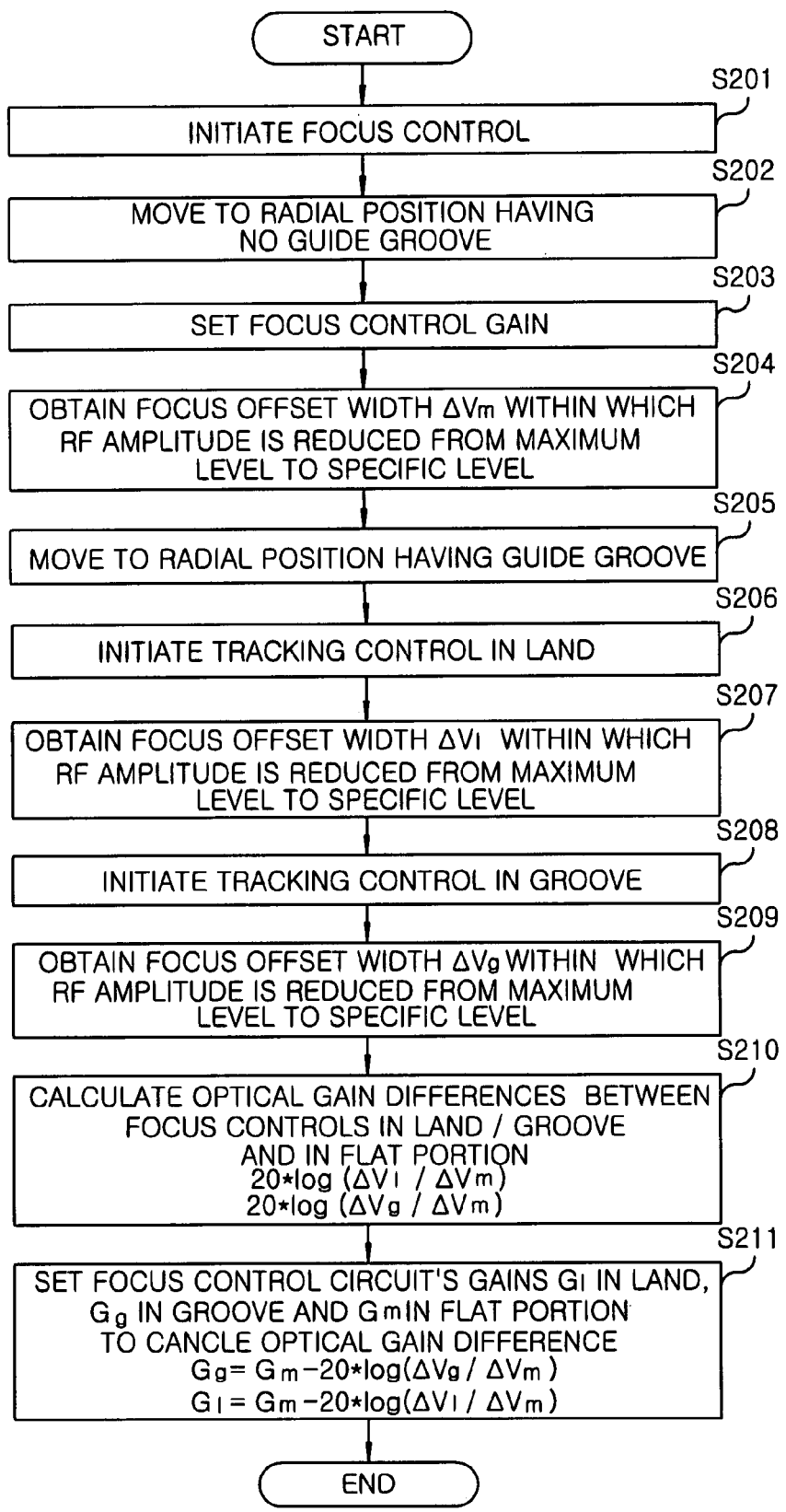
FIG. 2 provides a flowchart illustrating an operation of an optical disk apparatus in accordance with a second embodiment of the present invention.
Figure 3A:
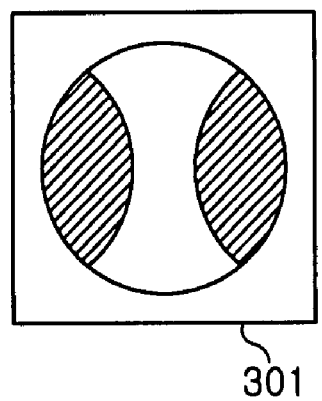
FIGS. 3A and 3B respectively depict a schematic diagram describing distributions of detected light from an optical disk.
Figure 3B:
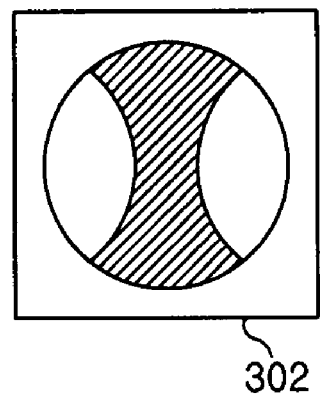
Figure 4A:
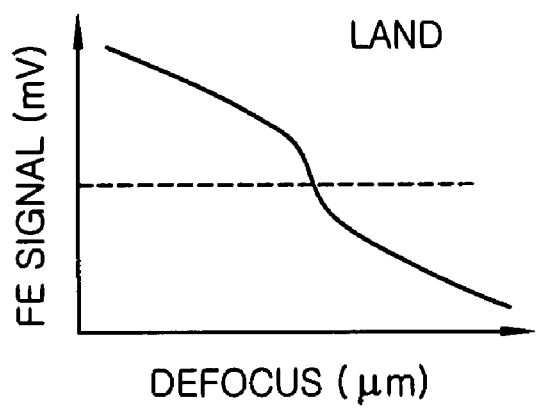
FIGS. 4A and 4B present characteristics of an FE signal in case of changing a distance between an optical disk and an objective lens at the center of a land track and a groove track, respectively.
Figure 4B:
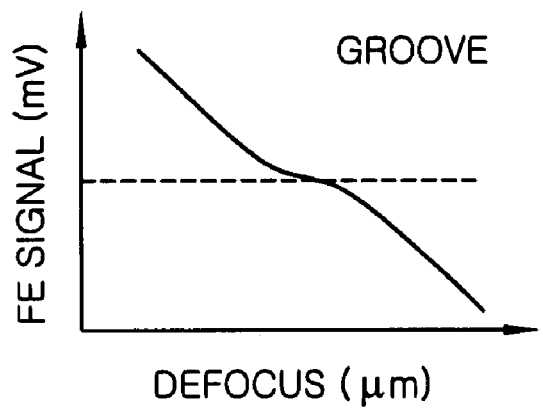

In this embodiment, an amplitude of an RF or an FS signal from an optical disk is used in measuring gain differences of a focus servo between land/groove and a flat portion having no guide groove of the optical disk to thereby set gains in the land and the groove. According to this embodiment, gains in land and groove are obtained quickly by using focus offset widths in land, groove and a flat portion of an optical disk having a guide groove, e.g., a DVD-RAM, with respect to variations of amplitudes of RF signals, based on gains of the focus servo in reproducing the optical disk kept in an optical disk drive and having no guide groove, e.g., a DVD-ROM. A control sequence using the RF signal will be explained with reference to the flowchart of FIG. 2.

First of all, a focus control for the optical disk is initiated (ON) (step S201).

Next, optical pickup unit (OPU) is driven by a feed motor in a radial direction (not shown) and then moved to a radial position having no guide groove (step S202). In case of a DVD-RAM or the like, even if it is a black disk, there exists an RF signal generated by pre-pits in a flat portion having no guide groove, the flat portion being placed at the innermost peripheral portion of a DVD-RAM or the like, and thus it is preferable to use the RF signal. Further, as in case of a DVD-ROM, the tracking control is carried out by using a differential phase detection (hereinafter, referred to as "DPD") method.

Thereafter, a focus control gain in the flat portion is set to a preset value or a value at which a focus control error is smaller than or equal to an allowable amount (step S203).

Next, though not shown, as in case of the land and the groove shown in FIGS. 7A and 7B, a focus offset width representing a range within which an amplitude of an RF signal reduces from a maximum level to a specific level is obtained (step S204). To be specific, the RF signal is reproduced to find a focus point where the RF signal reaches its maximum amplitude. Then, there is obtained a plus and a minus focus offset at which the RF signal reaches a level corresponding to 90% of the maximum amplitude for example, and the width between the two focus offsets (hereinafter, referred to as "$\Delta V_m$") is stored.

Then, the optical pickup unit is moved by the feed motor to a radial position having a guide groove (step S205).

Thereafter, a tracking control in the land is initiated (ON) (step S206).

Next, as in step S204, a focus offset width (hereinafter, referred to as "$\Delta V_l$") representing a range within which an amplitude of an RF signal reduces to a specific level from a maximum amplitude is obtained (step S207), as shown in FIGS. 7A and 7B.

Next, a tracking control in the groove is initiated (ON) (step S208).

Thereafter, as in step S204, a focus offset width (hereinafter, referred to as "$\Delta V_g$") representing a range within which an amplitude of the RF signal reduces to a specific level is also obtained in the groove (step S209).

From the above, optical focus gain differences between the land and the flat portion having no guide groove and between the groove and the flat portion are obtained as $20*\log(\Delta V_l/\Delta V_m)$ and $20*\log(\Delta V_g/\Delta V_m)$, respectively (step S210). For example, points "a" and "b" shown in FIG. 5 have different focus offsets, so that the gain differences between the land and the groove at points "a" and "b" are different. Therefore, in order to determine an average gain difference between the land and the groove, gains need to be measured at multiple points by using a frequency characteristic analyzer or a circuit having a same function as that of the frequency characteristic analyzer. However, in accordance with the measurement method of the present embodiment, an average gain difference in a measuring range can be easily obtained simply by measuring an amplitude of the RF signal.

By using the gain differences thus obtained, gains in the land and the groove of the focus control circuit are set (step S211). To be specific, gain $G_l$ in the land, gain $G_g$ in the groove and gain $G_m$ in the flat portion having no groove are set by Eq. 2 and Eq. 3 so that the optical gain difference can be canceled:

$$G_g = G_m - 20*\log(\Delta V_g/\Delta V_m) \quad \text{Eq. 2, and}$$

$$G_l = G_m - 20*\log(\Delta V_l/\Delta V_m) \quad \text{Eq. 3}$$

By setting the gains as described above, the gain difference generated by the focusing error signals from the land and the groove, which is, can be compensated by the focus control circuit. As a consequence, focus servo control gains, each gain including a pickup (or optical) and a circuit gain in the land and the groove, can be obtained. In accordance with the method of the present embodiment, there arises no need for an additional circuit for measuring open-loop characteristics of the focus servo. Also, the gains can be compensated with a simple operation of measuring a variation in an amplitude of an RF signal of an optical disk with respect to a defocusing in the land and the groove. Moreover, the gains in the land and the groove are set based on gain $G_m$ in the flat portion having no groove. The gains in the land and the groove vary depending on a width or a depth of the guide groove of the optical disk to be reproduced. On the other hand, the gain in the flat portion does not greatly vary due to the absence of the groove, i.e., the absence of ±first-order diffracted light. Therefore, for example, in case gain $G_m$ of the focus control circuit is set as an optimal value by utilizing a mirror surface of an additional optical disk and then stored in a memory (not shown) of the optical disk apparatus, gains $G_l$ and $G_g$ in the land and the groove of the focus control circuit can be quickly determined.

Embodiment 3

Figure 6A:
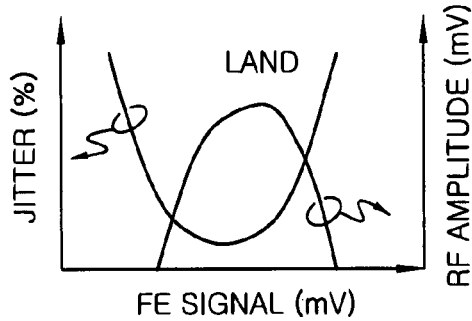
FIGS. 6A and 6B respectively offer a characteristic diagram illustrating a jitter and a variation in an RF amplitude with respect to a variation in an FE signal.
Figure 6B:
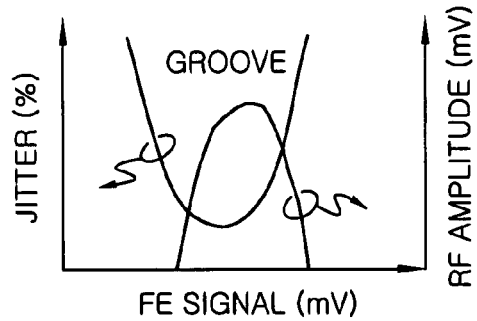

In this embodiment, in order to perform an optimal focus position learning in the land or the groove of the optical disk, an amplitude of a signal from the optical disk (an amplitude of an RF or an FS signal) or a quality thereof (jitters or error rates in an RF signal or an address signal) is measured while varying the focus offset. At this time, an adjustment step size of the focus offset for a part having a relatively lower optical gain of a focus control is set to be smaller than that for the other part. In case of the example shown in FIGS. 6A and 6B, a variation in jitters or RF amplitudes with respect to the FE signal is steeper in the groove. Therefore, if the adjustment step size of the focus offset for the groove is set to be smaller than that for the land, learning errors in both the land and the groove are reduced and, hence, an optimal focus position learning can be performed.

The optical disk apparatus of the present invention can stabilize the focus control by setting the focus control gain without using an equipment or a circuit for analyzing frequency characteristics. Thus, the optical disk apparatus of the present invention can be utilized as a disk drive for recording or reproducing the optical disk.

While the invention has been shown and described with respect to the embodiments, it will be understood by those skilled in the art that various changes and modification may be made without departing from the scope of the invention as defined in the following claims.

What is claimed is:

1. An optical disk apparatus comprising:
   an optical pickup unit for reading out information recorded on an optical disk;
   a demodulation circuit for demodulating digital data from an output signal of the optical pickup unit; and
   a controller for performing a servo control based on the output signal of the optical pickup unit,
   wherein, when performing a focus/tracking control in a recess and a protrusion of a guide groove of the optical disk, the controller obtains a focus control circuit gain difference between the recess and the protrusion by comparing focus offsets with respect to variations in amplitudes of signals from the optical disk for the recess and the protrusion, respectively,
   wherein a focus control circuit gain Gg for the recess is set as:

$$Gg = Gl - 20*\log(\Delta Vg/\Delta Vl)$$

wherein Gl is a focus control circuit gain for the protrusion; and $\Delta Vg$ and $\Delta Vl$ are focus offset widths in the recess and the protrusion, respectively, each width representing a range within which an amplitude of each signal from the optical disk reduces from a maximum level to a specific level.

2. The optical disk apparatus of claim 1, wherein the focus control circuit gain in the recess and the protrusion are set by comparing the focus offsets with respect to the variations in the amplitudes of the signals from the optical disk for the recess and the protrusion, respectively.

3. The optical disk apparatus of claim 2, wherein the signals from the optical disk are summation signals.

4. An optical disk apparatus comprising:
   an optical pickup unit for reading out information recorded on an optical disk;

a demodulation circuit for demodulating digital data from an output signal of the optical pickup unit; and a controller for performing a servo control based on the output signal of the optical pickup unit, wherein, when performing a focus/tracking control in a recess and a protrusion of a guide groove of the optical disk, the controller obtains a focus control circuit gain difference between the recess and the protrusion by comparing focus offsets with respect to variations in amplitudes of signals from the optical disk for the recess and the protrusion of the guide groove and a flat portion having no guide groove, respectively, wherein a focus control circuit gain Gg for the recess and a focus control circuit gain Gl for the protrusion of the guide groove are set as:

$Gg=Gm-20*\log(\Delta Vg/\Delta Vm)$; and $Gl=Gm-20*\log(\Delta Vl/\Delta Vm)$ wherein Gm is a focus control circuit gain for the flat portion having no guide groove; and $\Delta Vg$, $\Delta Vl$ and $\Delta Vm$ are focus offset widths in the recess, the protrusion and the flat portion, respectively, each width representing a range within which an amplitude of each signal from the optical disk reduces from a maximum level to a specific level.

5. The optical disk apparatus of claim 4, wherein the focus control circuit gain in the recess and the protrusion are set by comparing focus offsets with respect to the variations in the amplitudes of the signals from the optical disk for the recess and the protrusion of the guide groove, and the flat portion having no guide groove, respectively.

6. The optical disk apparatus of claim 5, wherein the signals from the optical disk are summation signals.

* * * * *